(12) United States Patent
Martin

(10) Patent No.: US 6,612,169 B1
(45) Date of Patent: Sep. 2, 2003

(54) APPARATUS FOR ENGINE LUBRICANT LEVEL DETECTION

(75) Inventor: Thomas Martin, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/143,444

(22) Filed: May 10, 2002

(30) Foreign Application Priority Data

May 10, 2001 (EP) .............................................. 01111395

(51) Int. Cl.$^7$ ............................ G01F 23/20; G08B 21/00
(52) U.S. Cl. ............................ 73/293; 23/295; 340/619; 340/622
(58) Field of Search ............................ 73/290 R, 304 R, 73/295, 293; 340/619, 622; 250/900, 904

(56) References Cited

U.S. PATENT DOCUMENTS

| | | | | | |
|---|---|---|---|---|---|
| 3,272,174 A | * | 9/1966 | Pribonic | ................... | 250/577 |
| 3,535,933 A | * | 10/1970 | Pliml, Jr. | ................... | 250/577 |
| 4,155,013 A | * | 5/1979 | Spiteri | ................... | 250/577 |
| 4,468,567 A | * | 8/1984 | Sasano et al. | ................... | 250/577 |
| 4,870,292 A | * | 9/1989 | Alpert et al. | ................... | 250/577 |
| 5,785,100 A | * | 7/1998 | Showalter et al. | ................... | 141/198 |
| 5,808,187 A | * | 9/1998 | Gooden et al. | ................... | 73/118.1 |
| 6,228,804 B1 | * | 5/2001 | Nakashima | ................... | 250/577 |

* cited by examiner

Primary Examiner—Hezron Williams
Assistant Examiner—Katina Wilson
(74) Attorney, Agent, or Firm—Carlos L. Hanze

(57) ABSTRACT

The invention relates to an indicator system for fluid levels, including two or more optically and/or thermally conducting fibers, preferably suitable for indicating the fluid level of a lubricant in the case of piston internal combustion engines. In this case, the fibers are either provided at the end with a substance varying in optical properties under the action of heat, or contain chambers which are filled with an appropriate substance.

9 Claims, 4 Drawing Sheets

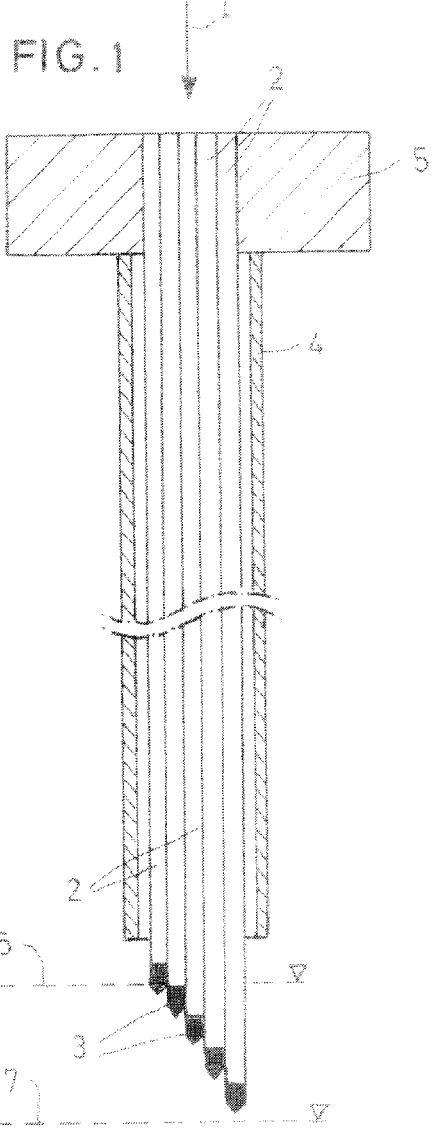
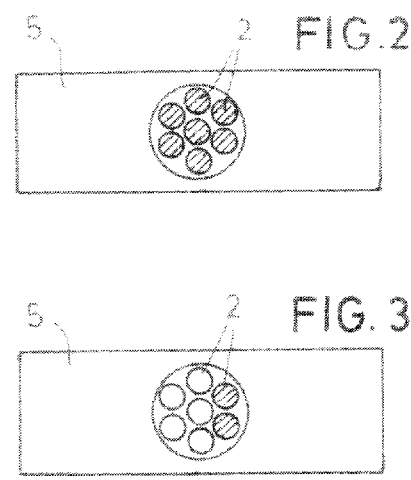
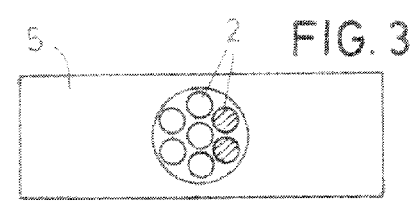
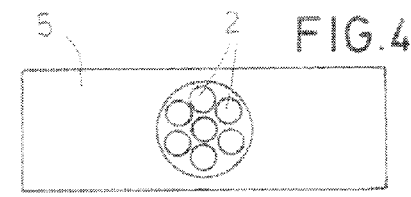

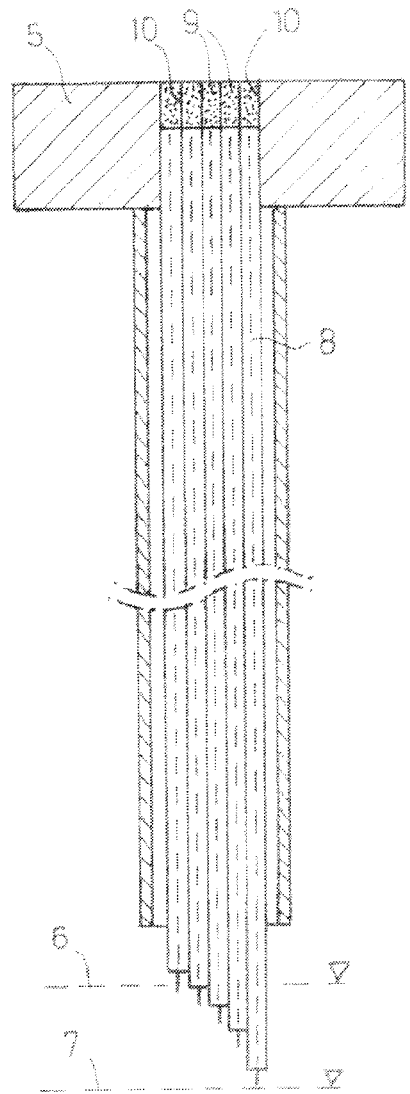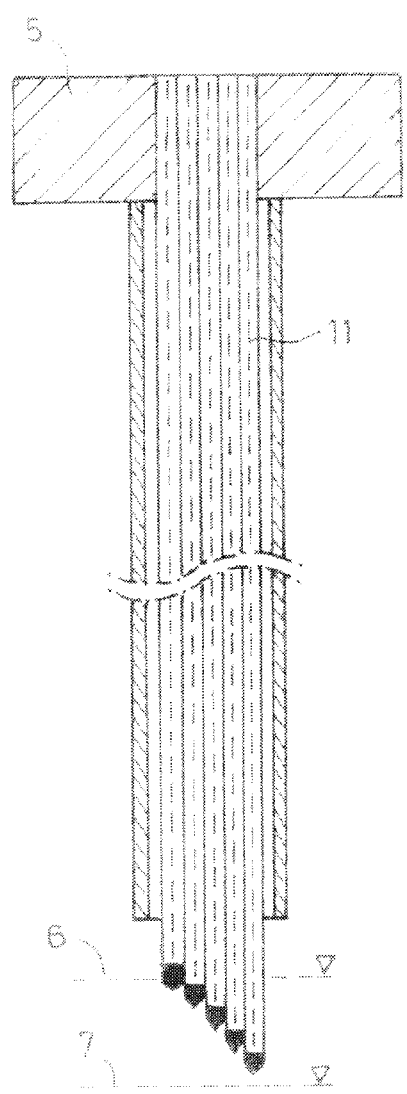

FIG.7
FIG.8
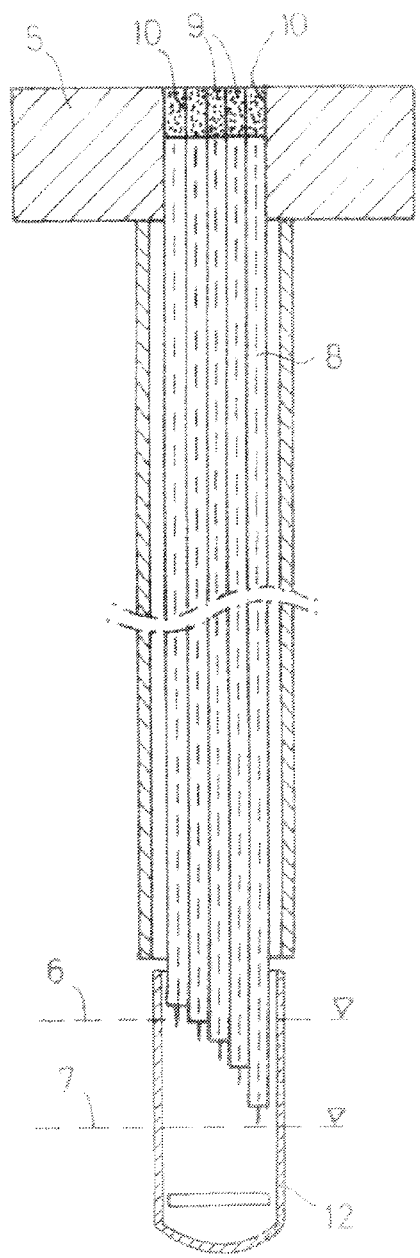
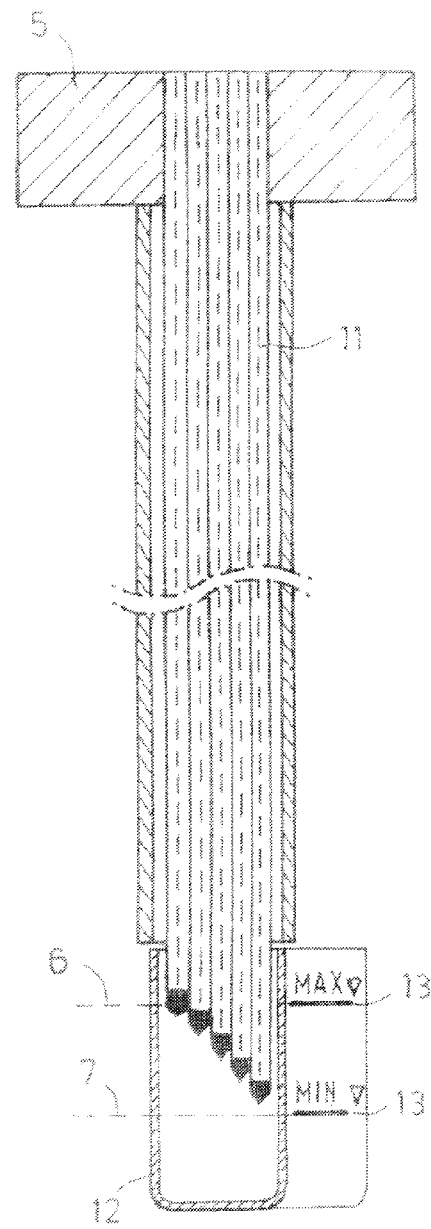

APPARATUS FOR ENGINE LUBRICANT LEVEL DETECTION

FIELD OF THE INVENTION

The invention relates to an indicator system for fluid levels, including two or more optically or thermally conducting fibers, preferably suitable for indicating the fluid level of lubricants in the case of piston internal combustion engines.

BACKGROUND OF THE INVENTION

A fluid level indicator employing optical fibers is disclosed in JP 63284423. In this case, a bundle of optical fibers of different length, which are inclined at 45° at the fluid end, are used for the purpose of indicating the fluid level in a container. In this case, use is made of the change in the refractive index which causes a fiber located in a fluid to appear dark, but a fiber located outside a fluid to appear bright. The fiber bundle is then led to a suitable point, located on the surface of the piston internal combustion engine, so that the above-described effect can easily be detected.

These known devices have two disadvantages. Firstly, lubricants of piston internal combustion engines have a pronounced wetting ability, and so lubricant remnants can remain on fibers which are already as such no longer located in the fluid and thereby falsify the measurement result.

Secondly, the light conditions inside piston internal combustion engines are very often restricted, and so it is difficult or impossible to read off the fluid level. This known disadvantage has been corrected to date by using an extraneous light source, mostly in combination with a saddle-shaped facet of the fibers. However, this greatly increases the number of the necessary parts and the costs.

SUMMARY OF THE INVENTION

Against this background, it is the object of the present invention to improve a fluid level indicator in such a way that it becomes more insensitive to being wetted by a fluid and, moreover, requires a lower level of extraneous light.

This object is achieved according to the invention by a fluid level indicator having the features of claim 1. Further advantageous refinements are included in the subclaims.

By virtue of the fact that the optical fiber bundle is provided at the fluid end with a substance which changes its optical properties under the action of heat, during operation, or directly after operation, of a piston internal combustion engine, the fibers, which reach into the lubricant, will change their optical properties owing to the operational heat of the lubricant of a piston internal combustion engine, and thus indicate the fluid level of the lubricant. Given the use of two fibers of different length, it is thereby possible to indicate the minimum and maximum fluid level. In the case of the use of a plurality of fibers of different graduated length, it is possible to indicate the fluid level differentially.

A further design of the present invention consists in that the fibers of the fluid level indicator each include at the fluid end a chamber which is filled with a substance, preferably a metal salt, varying in optical properties under the action of heat. This prevents the abovementioned substance from being lost through aging, wear or the like.

In a further refinement of the invention, the fibers consist of a thermally conducting material, which fibers are provided at the inspection end with a substance varying in optical properties under the action of heat. In this case, the individual fibers are thermally insulated from one another such that the fibers located in the fluid can conduct the heat to a suitable point on the surface of the piston internal combustion engine so that the optical reaction of the above-named substance is more easily visible.

In the case of a further advantageous design, the thermally conducting fibers are each provided at the inspection end with a chamber which is filled with a substance, preferably a metal salt, varying in optical properties under the action of heat, and is sealed by a transparent cover.

In a further advantageous refinement of the invention, the fibers consist of an optically and simultaneously thermally conductive material. The fibers are provided in this case at the fluid end with a substance which changes its optical properties under the action of heat, and each include at the inspection end a chamber which is filled with a substance, preferably a metal salt, varying in optical properties under the action of heat, and is sealed with a transparent cover. Under the action of heat, a change occurs in the optical properties both at the fluid end and at the inspection end, and this leads to a contrast enhancement which, in turn, renders it possible to read off more easily.

In a further advantageous design, the fluid level indicator is dimensioned such that an existing lubricant dipstick of a piston internal combustion engine can be replaced. In this case, the inspection end of the fibers is integrated in a sealing plate, and the fibers are designed such that an existing guide tube can be used.

In a further refinement of the invention, the above-named designs can be further improved by fitting a protective cap on the fluid end. This protective cap is permeable to fluids, such that the actual fluid level is present at the fiber ends according to the invention. The aim of this is to prevent fluid splashes from reaching the fibers above the fluid level, and thereby falsifying the measurement result.

An advantageous design of the protective cap is provided with markings which correspond to currently known markings on oil dipsticks for piston internal combustion engines for the purpose of determining the lubricant level.

A further advantageous embodiment provides for the inspection ends of the fibers to be guided into the passenger compartment such that it is possible to read off the fluid level during operation and/or without opening the engine compartment.

DETAILED DESCRIPTION OF THE INVENTION

The invention is explained in more detail with the aid of exemplary embodiments shown in the attached drawings, in which:

FIG. 1 shows a schematic side view of the fluid level indicator according to the invention with optical fibers;

FIG. 2 shows a schematic view of the inspection end of the fluid level indicator in the direction of the arrow I in FIG. 1, in the case of which all the fiber ends are located in the fluid;

FIG. 3 shows a schematic view of the inspection end of the fluid level indicator in the direction of the arrow I in FIG. 1, in which case some fiber ends are located in the fluid;

FIG. 4 shows a schematic view of the inspection end of the fluid level indicator in the direction of the arrow I in FIG. 1, in which case no fiber end is located in the fluid;

FIG. 5 shows a schematic side view of the fluid level indicator according to the invention, with thermally conducting fibers;

FIG. 6 shows a schematic side view of the fluid level indicator according to the invention, with optically and thermally conducting fibers;

FIG. 7 shows a schematic side view of the fluid level indicator according to the invention, with thermally conducting fibers and additional protective cap;

FIG. 8 shows a schematic side view of the fluid level indicator according to the invention, with optically and thermally conducting fibers and additional protective cap with markings.

Corresponding components are provided with the same reference numerals in FIGS. 1 to 9.

Figure 9:
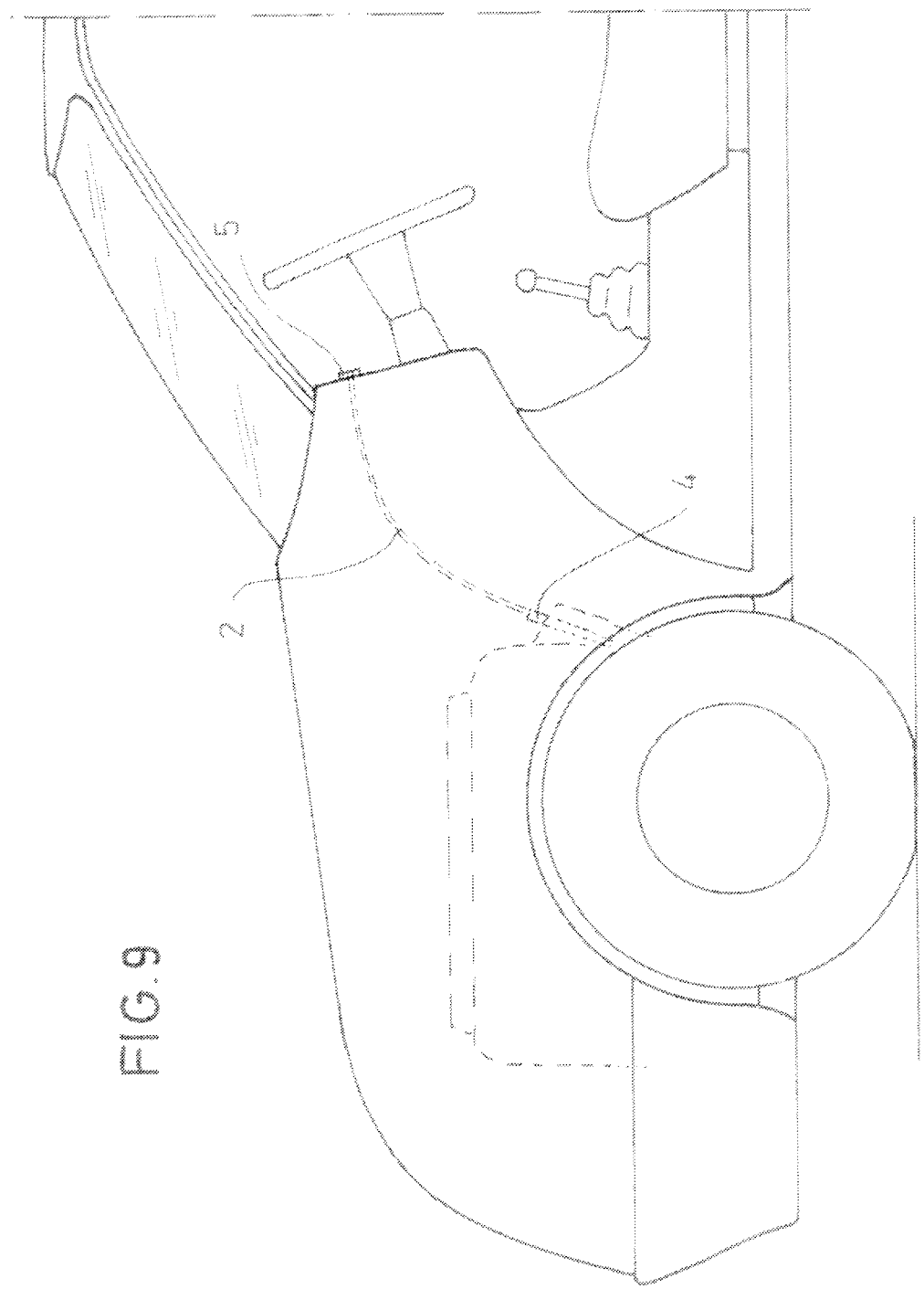
FIG. 9 shows a schematic view of the fluid level indicator according to the invention, in the case of which the inspection ends of the fibers are guided into the passenger compartment.

A fluid level indicator according to the invention is illustrated in side view in FIG. 1. The optical fibers 2 are to be seen, as are the ends 3, provided with a substance, a guide tube 4, a sealing plate 5 and an assumed maximum and minimum fluid level 6, 7, indicated in each case by a dashed line. In the case of the maximum fluid level 6, 7, all the fibers 2 are located with their reactive ends in the fluid. In the case of a heated fluid, an optical reaction now takes place. This variation is then visible from the outside to a viewer when he looks in the direction of the arrow I onto the sealing end 5. This results in an image as is to be seen in FIG. 2. FIGS. 3 and 4 show the same view for a lower and/or minimum fluid level.

FIG. 5 shows a side view of the fluid level indicator 1 according to the invention, with thermally conducting fibers 8. In this case, the fibers 2 located in the fluid conduct the heat to the chambers 10 filled with a substance 9. Here, as well, the change in the optical properties also permits the fluid level to be inferred.

FIG. 6 shows a side view of the fluid level indicator 1 according to the invention, with optically and thermally conducting fibers 11.

A variant of FIG. 5 with an additional protective cap 12 is provided in FIG. 7.

FIG. 8 shows the fluid level indicator 1 according to the invention, with optically and thermally conducting fibers 11 and the protective cap 12, which is, in turn, provided with markings 13 for determining the fluid level.

FIG. 9 shows a view of the fluid level indicator 1 according to the invention, in the case of which the inspection end has been guided into the passenger compartment.

What is claimed is:

1. An apparatus for engine lubricant level detection, comprising at least one optically conducting fiber, said fiber comprising a measuring end having a substance varying in optical properties in the presence of heat or a fluid end having a chamber filled with the substance.

2. The apparatus according to claim 1, further comprising a protective cap.

3. The apparatus according to claim 2, further comprising one or more markings disposed on said protective cap.

4. An apparatus for engine lubricant level detection, comprising at least one thermally conducting fiber, said fiber comprising an indicator end having a chamber filled with a substance varying in optical properties in the presence of heat.

5. The apparatus according to claim 4, further comprising a protective cap.

6. The apparatus according to claim 5, further comprising one or more markings disposed on said protective cap.

7. An apparatus for engine lubricant level detection, comprising two or more optically and thermally conducting fibers, wherein each fiber comprises a fluid end having a substance (3) varying in optical properties in the presence of heat, or an indicator end having a chamber (10) also filled with said substance.

8. The apparatus according to claim 7, further comprising a protective cap.

9. The apparatus according to claim 8, further comprising one or more markings disposed on said protective cap.

* * * * *